March 6, 1951  C. C. CHANDLER  2,543,893
AUTOMATIC GATE
Filed July 21, 1947  2 Sheets-Sheet 2
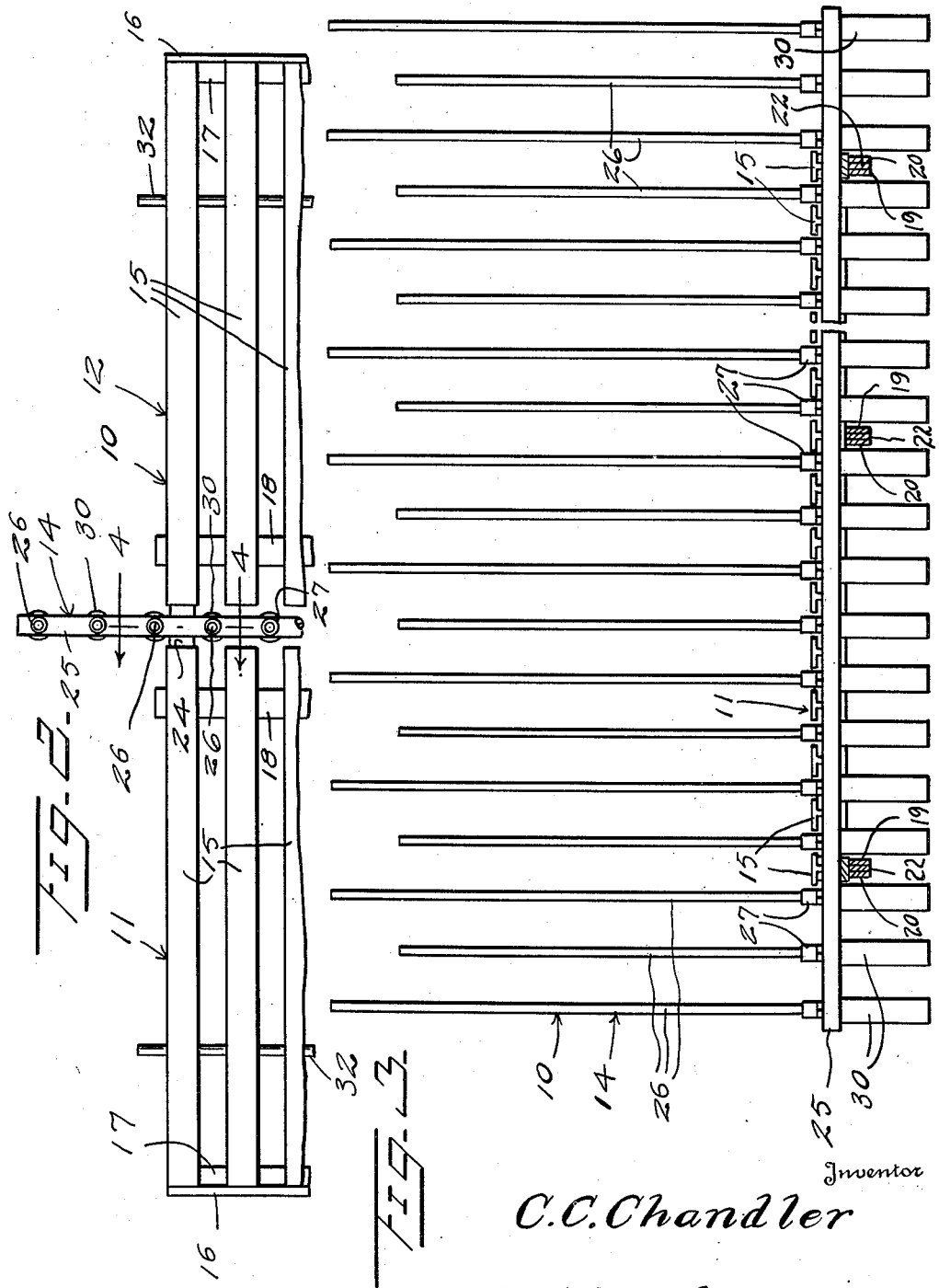
Inventor
C. C. Chandler
By Kimmel & Crowell
Attorneys Patented Mar. 6, 1951

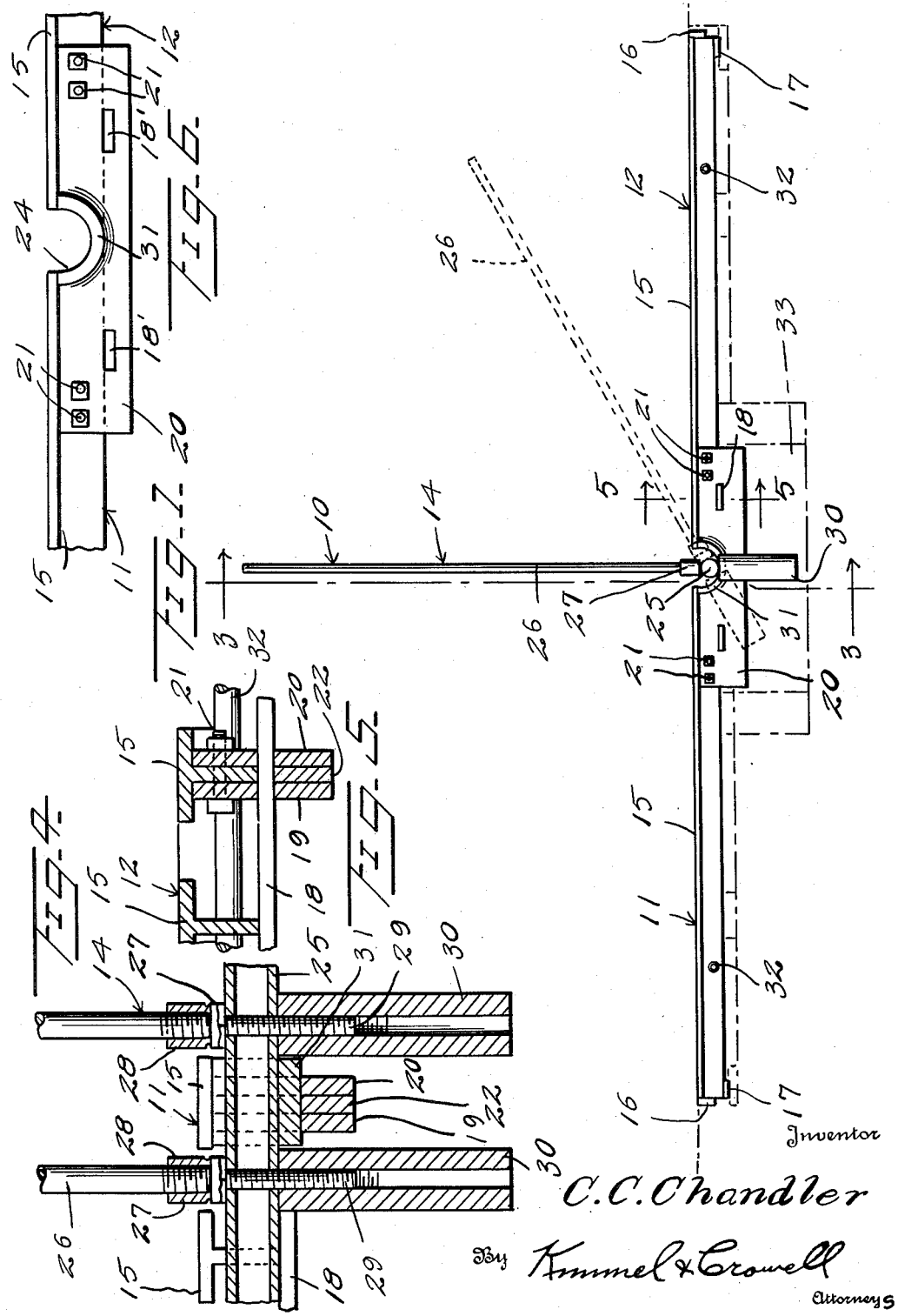

2,543,893

UNITED STATES PATENT OFFICE 2,543,893

AUTOMATIC GATE

Chester C. Chandler, Austin, Tex.

Application July 21, 1947, Serial No. 762,351

3 Claims. (Cl. 39—44)

This invention relates to so-called "cattle guards" and more particularly to the gate for fences about pastures and the like, which are normally biased to the closed position to prevent cattle and horses from passing through the gate while being readily opened by the force of a car or pedestrian pushing against the weighted pickets.

It is an object of this invention to provide an improved automatic cattle gate of the kind to be more specifically described hereinafter, which will effectively exclude all animals from passing through while readily permitting the passage of automobiles and pedestrians.

Heretofore gates of the "cattle guard" type have been effective to exclude only cattle, since all other animals could walk the tread for the automobile. The "bump" type gates were so constructed and arranged that the cars were frequently damaged by bumping the gate. Such gates were expensive in their own cost and upkeep as well as damaging to the cars, and were not effective for all animals. Realizing the cost and exclusive use of such gates, the farmers, ranchers, and others having use for them have resorted to the antiquated form of gates which required the operator of a car to leave his car to open and close the gate. The use of the antiquated hinged gates has the obvious difficulties of opening the gate in inclement weather and the waste of much time in the complete process of passing through the gate in an automobile.

Therefore, it is an object of this invention to provide a gate of this kind having a grated ramp which will exclude all but the smaller animals, and a pivotable gate having pickets close enough together to prevent the smaller animals from going between the pickets.

Another object of this invention is to provide a gate of this kind having a pivotal gate weighted below the pivot axis to hold the gate erect irregardless of the grade or inclination of the ramps, and of sufficient weight to prevent small animals from pushing against and opening it, while readily permitting a car to rock the gate to its open position.

Still another object of this invention is to provide a gate of this kind having wooden or soft pickets to prevent damage to the automobiles while bumping against them, and which pickets will break before damaging the car. Being but wooden rods readily insertable in the pivoted axis, damaged pickets may be readily replaced at a very low cost.

A still further object of this invention is to provide a gate of this kind which may be readily built in sections at a low cost and readily and efficiently assembled where desired.

With the above and other objects in view, my invention consists in the arrangement, combination and details of construction disclosed in the drawings and specification, and then more particularly pointed out in the appended claims.

In the drawings,

Figure 1 is a side elevation of a gate constructed according to an embodiment of this invention, Figure 2 is a top plan view, partly broken away, of one end of the gate, Figure 3 is a transverse section taken on the line 3—3 of Figure 1, Figure 4 is a fragmentary section taken on the line 4—4 of Figure 2, Figure 5 is a fragmentary detailed section taken on the line 5—5 of Figure 1; and Figure 6 is a side elevation, partly broken away, of the connection plate between the opposed ramp sections.

Referring to the drawings, the numeral 10 designates generally a weighted pivotal cattle gate constructed according to an embodiment of this invention. The gate 10 is formed of a pair of grated ramp members 11 and 12, and a pivoted picket gate 14 supported between the adjacent spaced apart ends of the ramp members 11 and 12. The ramp sections 11 and 12 are adapted to be formed separately of identical construction so that they may be interchanged with no regard to left or right sections in their manufacture, so a description of one section will be applicable to the other.

The ramp sections 11 and 12 are formed as a grate so that all the larger animals as cattle and horses will be reluctant to tread on them, while providing sufficient tread surface for the wheels of an automobile or truck. The sections 11 and 12 are formed of elongated transversely spaced apart T sections 15, of metal or other suitable material. The upper horizontal cross arms of the T sections 15 form the tread surface while the vertical arm provides the stiffening member for resistance against bending while supporting the weight of an automobile or truck. The T members 15 are rigidly connected together at their outer ends by a frame member 16 which abuts the outer ends of the members 15 and is secured thereto by welding or other suitable fastening means. A lower connecting member 17 is fixed to the outer ends of the sections 11 and 12. The connecting member 17 extends across the sections and is secured to the lower edge of the members 15 at their outer ends by welding or other fastening means.

The inner ends of the grate sections 11 and 12 are completed by an inner cross member 18 which is welded to the lower edge of the T sections 15 a short distance from the inner ends of the sections 15 so that the inner ends of the sections 15 overhang the inner transverse connecting member 18.

To form the complete ramp, the opposite ramp sections 11 and 12 are connected together at their inner ends by connecting plates 19 and 20. The connecting plates 19 are fixed to the inner side of the outer grate member 15 and the plates 20 are fixed to the outer side of the outer members 15. Bolts, as 21, engage through the plates 19 and 20 and the vertical web of the T sections 15 so the ramp members may be disconnected at will. The plates 19 and 20 extend downwardly below the web of the sections 15 and are spaced apart by a filler or spacer plate 22. The plates 19 and 20 are apertured below the webs of the members 15 and the transverse members 18 are extended through the openings to form stops for the gate 14 in its lowered position. Notches 24 are formed in the plates 19 and 20 along the upper edge at the longitudinal center thereof to provide a bearing for the pivot bar 25 of the gate 14. The inner ends of the members 15 terminate at the outer edges of the semi-circular notches 24.

The gate 14 is formed with a transverse pivot bar 25 journaled loosely in the bearings or notches 24 of the plates 19 and 20. The pickets 26 are fixed rigidly to the bar 25 and spaced apart along its length. To hold the pickets 26 erect weights are provided below the pivot bar 25 rigidly secured thereto. While the gate 10 proper may be made of metal the pickets 26 are made of wood or other soft frangible material so they will not scratch the automobile or otherwise damage it.

Screw fittings 27 are fixedly carried by the pivot bar 25 for attaching the weights and pickets. The fittings 27 are formed with an internally threaded tubular upper end or socket 28 in which the lower ends of the pickets are engageable and a lower downwardly extending screw or bolt 29. The bolt 29 is adapted to extend through the tubular pivot bar 25 and the tubular weighted members 30 are adapted to threadably engage the lower end of the bolt 29 to form a nut therefor. The weight 30 of each picket 26 is sufficient to hold that picket erect so any number of picket sections may be used, each providing its own counterweight.

Segmental bearing members 31 are secured to the outer edges of the plates 20 about the notch 24. The bearing members 31 are provided for engagement with the weight 30 of the adjacent picket to hold the gate 14 against endwise movement between the ramp sections 11 and 12. The pickets 26 are so disposed along the length of the pivot bar 25 that they will engage between the horizontal cross arms of adjacent grate members 15 in their lowered position. The pickets 26 are supported in their lowered position at their outer ends by a transverse supporting rod 32 engaging through the vertical webs of the grate members 15 intermediate their length and spaced downwardly from the horizontal arms a distance to support the pickets 26 with their upper edge flush with the upper surface of the ramp. In this manner the pickets are held from becoming caught below the horizontal arms of the grate members 15.

In the use and operation of the gate 10, the ramp sections 11 and 12 are disposed over the surface of the ground with a trench as 33 at the center. The weights 30 of the gate 14 are adapted to swing freely in the trench 33 from a vertical to a horizontal position. As most large animals will be reluctant to walk on the grates of the ramps, the grate alone will exclude them from passing through the gate and the proximity of the adjacent pickets 26 will prevent smaller animals from going through. As an automobile approaches the gate 14, the bumper will push the gate down against the weights 30 and the tires over the adjacent members 15 will hold the pickets down until the car has gone completely through the gate 10. The weights 30 will return the pickets to their erect position. Since all of the pickets are fixed on the rod 25, movement of one picket 26 will cause rocking of the entire gate 14. Gates of this construction have been successfully operated with automobiles passing through the gate at speeds of about 35 M. P. H. without damage to the gate or to the car in any way. As the pickets are formed to be frangible, any wear or damage will be taken by the pickets 26, which may be readily and economically replaced.

I do not mean to confine myself to the exact details of construction herein disclosed, but claim all variations falling within the purview of the appended claims.

What I claim is:

1. A gate of the kind described comprising a pair of grate sections spaced apart at their inner adjacent ends, each of said grate sections including a plurality of spaced apart longitudinally extending elongated grate members, a plurality of connecting plates secured to the adjacent inner ends of selected ones of said grate members of said sections, the top edges of said plates being disposed below the top edges of said grate members and formed with arcuate notches therein, a bearing member carried in each of said notches, a transverse connecting member on each of said grate sections engaging through said grate members intermediate the length thereof and spaced downwardly from the top edge thereof, a gate member including a horizontal tubular member rockably carried by said bearing members, a plurality of spaced apart pickets, means for securing said pickets to said tubular member, and a plurality of weight members secured to said means in diametrically opposed relation to said pickets for normally urging said pickets to an upright position, said pickets being disposed between said spaced apart elongated grate members whereby when said gate is rocked to the horizontal position said pickets will be received between said elongated grate members and below the top edges thereof and said transverse members will engage said pickets for limiting the rocking of said gate.

2. A gate as set forth in claim 1, in which the side edges of said bearing members slidably engage the sides of adjacent weight members for preventing transverse movement of said gate member relative to said pair of grate section.

3. A gate as set forth in claim 1, in which said means includes a plurality of fittings, each of said fittings having an internally threaded socket on one end thereof adapted to receive one of said pickets and an integral reduced diameter externally threaded stud on the other end thereof adapted to extend diametrically through said tubular member, and said weight members are each formed with an internally threaded bore adapted to threadedly engage on said stud with the top end of said weight member bearing against said tubular member for providing a rigid mounting for said pickets and said weight members on said tubular member.

CHESTER C. CHANDLER.

REFERENCES CITED

The following references are of record in the file of this patent:

UNITED STATES PATENTS

| Number | Name | Date |
|---|---|---|
| 1,357,896 | Petty | Nov. 2, 1920 |
| 1,576,442 | Mathews | Mar. 9, 1926 |
| 1,605,485 | Thompson | Nov. 2, 1926 |
| 2,044,658 | Abbey | June 16, 1936 |